(12) United States Patent
Li et al.

(10) Patent No.: US 12,307,779 B2
(45) Date of Patent: May 20, 2025

(54) VEHICLE VIDEO RECORDING FRAMEWORK

(71) Applicant: GM Global Technology Operations LLC, Detroit, MI (US)

(72) Inventors: Chuan Li, Troy, MI (US); Esther Anderson, Canton, MI (US); Jace C. Stokes, Highland, MI (US); Peter Finnegan, Marietta, GA (US); Fan Bai, Ann Arbor, MI (US); Tarik Mahmood, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 18/170,033

(22) Filed: Feb. 16, 2023

(65) Prior Publication Data

US 2024/0282114 A1    Aug. 22, 2024

(51) Int. Cl.
G06V 20/56    (2022.01)
G06V 10/25    (2022.01)
G06V 20/40    (2022.01)

(52) U.S. Cl.
CPC ............. G06V 20/56 (2022.01); G06V 10/25 (2022.01); G06V 20/41 (2022.01); G06V 20/44 (2022.01)

(58) Field of Classification Search
CPC ........ G06V 20/56; G06V 10/25; G06V 20/41; G06V 20/44; G06V 10/22; G06V 10/255; G06V 10/764; G06V 20/40; G06V 2201/07; G06F 16/435
USPC ........................................................ 348/148
See application file for complete search history.

(56) References Cited

U.S. PATENT DOCUMENTS

| | | |
|---|---|---|
| 11,595,619 B1 | 2/2023 | Gate et al. |
| 2012/0105637 A1 | 5/2012 | Yousefi et al. |
| 2013/0321629 A1 | 12/2013 | Zhang et al. |
| 2017/0150299 A1 | 5/2017 | Coutinho et al. |
| 2017/0347158 A1 | 11/2017 | Fu et al. |
| 2018/0048850 A1* | 2/2018 | Bostick ................. G06V 20/56 |
| 2018/0139585 A1 | 5/2018 | Gholmieh et al. |
| 2018/0297210 A1 | 10/2018 | Peterson et al. |

(Continued)

OTHER PUBLICATIONS

"Cadillac CELESTIQ Establishes New Standard of Automotive Luxury," Cadillac Pressroom, Oct. 27, 2022, https://media.cadillac.com/media/us/en/cadillac/home.detail.print.html/content/Pages/news/us/en/2022/oct/1017-celestiq.html.

(Continued)

*Primary Examiner* — Masum Billah
(74) *Attorney, Agent, or Firm* — Vivacqua Crane, PLLC

(57) ABSTRACT

A system for processing a plurality of video recordings for a vehicle includes a camera system including a camera buffer. The system also includes a video storage device. The system also includes a vehicle communication system configured to communicate with a remote server. The system also includes a vehicle controller. The vehicle controller is programmed to capture one of the plurality of video recordings using the camera system. The one of the plurality of video recordings is stored to the camera buffer. The vehicle controller is also programmed to generate at least one event video file based on the one of the plurality of video recordings and save the at least one event video file to the video storage device. The vehicle controller is also programmed to upload the at least one event video file from the video storage device to the remote server using the vehicle communication system.

20 Claims, 4 Drawing Sheets

(56) References Cited

U.S. PATENT DOCUMENTS

| | | |
|---|---|---|
| 2018/0299900 A1 | 10/2018 | Bae et al. |
| 2018/0367731 A1 | 12/2018 | Gatti et al. |
| 2018/0376067 A1 | 12/2018 | Martineau |
| 2019/0073539 A1 | 3/2019 | Yu et al. |
| 2019/0230323 A1 | 7/2019 | Koravadi et al. |
| 2019/0253853 A1 | 8/2019 | Makled et al. |
| 2019/0320328 A1 | 10/2019 | Magzimof et al. |
| 2019/0325667 A1 | 10/2019 | Kim et al. |
| 2019/0340844 A1 | 11/2019 | Tonshal et al. |
| 2019/0354111 A1 | 11/2019 | Cheng et al. |
| 2019/0355178 A1 | 11/2019 | Martinez et al. |
| 2020/0074326 A1 | 3/2020 | Balakrishnan et al. |
| 2020/0351322 A1 | 11/2020 | Magzimof et al. |
| 2021/0109881 A1* | 4/2021 | Moustafa .............. H04L 1/0041 |
| 2021/0256754 A1 | 8/2021 | Guo |
| 2022/0137615 A1 | 5/2022 | Eperjesi et al. |
| 2022/0161816 A1 | 5/2022 | Gyllenhammar et al. |
| 2022/0368860 A1 | 11/2022 | Shinohara et al. |
| 2022/0368972 A1 | 11/2022 | Cheraghi et al. |
| 2022/0394283 A1 | 12/2022 | Cao |
| 2023/0026675 A1 | 1/2023 | Wingarten |
| 2023/0096468 A1 | 3/2023 | Ong et al. |
| 2023/0269566 A1 | 8/2023 | Spagnolini et al. |

OTHER PUBLICATIONS

Ahlswede, et al. "Network Information Flow," IEEE Transactions on Information Theory, vol. 46, No. 4, Jul. 2000, pp. 1204-1216.

Byers, et al. "A digital fountain approach to reliable distribution of bulk data," Conference on Applications, Technologies, Architectures, and Protocols for Computer Communication, 1998, pp. 56-67.

Chou, et al. "Practical Network Coding," Microsoft Allerton Conference on Communication, Control, and Computing, Oct. 2003, pp. 1-10.

Lopez, Jonathan. "General Motors Developing Connected Camera Platform," GM Authority Blog, Oct. 11, 2021, https://gmauthority.com/blog/2021/10/general motors-developing-connected-camera-platform/.

U.S. Appl. No. 18/150,371, filed Jan. 5, 2023.
U.S. Appl. No. 18/158,743, filed Jan. 24, 2023.
U.S. Appl. No. 18/170,038, filed Feb. 16, 2023.
U.S. Appl. No. 18/170,060, filed Feb. 16, 2023.

* cited by examiner

VEHICLE VIDEO RECORDING FRAMEWORK

INTRODUCTION

The present disclosure relates to systems and methods for improving occupant awareness for a vehicle, and more particularly to vehicle digital video recording systems and methods.

To increase occupant awareness and convenience, vehicles may be equipped with digital video recording systems which are configured to capture images and/or videos of events taking place in an environment surrounding the vehicle. Digital video recording systems may use at least one camera affixed in/on the vehicle to monitor for events and capture images/videos. Digital video recording systems may categorize events based on a plurality of characteristics. However, digital video recording systems may fail to account for additional factors, such as multiple events occurring simultaneously. Additionally, digital video recording systems may lack an ability for vehicle occupants to view recordings captured by the digital video recording system in a timely manner.

Thus, while current digital video recording systems and methods achieve their intended purpose, there is a need for a new and improved system and method for digital video recording for a vehicle.

SUMMARY

According to several aspects, a system for processing a plurality of video recordings for a vehicle is provided. The system includes a camera system configured to capture the plurality of video recordings of an environment surrounding the vehicle. The camera system includes a camera buffer configured to store the plurality of video recordings. The system also includes a video storage device. The system also includes a vehicle communication system configured to communicate with a remote server. The system also includes a vehicle controller in electrical communication with the camera system, the video storage device, and the vehicle communication system. The vehicle controller is programmed to capture one of the plurality of video recordings using the camera system. The one of the plurality of video recordings is stored to the camera buffer. The vehicle controller is also programmed to generate at least one event video file based on the one of the plurality of video recordings. The vehicle controller is also programmed to save the at least one event video file to the video storage device. The vehicle controller is also programmed to upload the at least one event video file from the video storage device to the remote server using the vehicle communication system.

In another aspect of the present disclosure, to capture the one of the plurality of video recordings, the vehicle controller is also programmed to identify a plurality of events in the one of the plurality of video recordings. To capture the one of the plurality of video recordings, the vehicle controller is also programmed to determine an importance level for each of the plurality of events in the one of the plurality of video recordings.

In another aspect of the present disclosure, to generate the at least one event video file, the vehicle controller is also programmed to generate the at least one event video file based on the one of the plurality of video recordings. The at least one event video file includes metadata identifying one of the plurality of events in the one of the plurality of video recordings having a highest importance level.

In another aspect of the present disclosure, the one of the plurality of video recordings includes a plurality of groups of pictures. To capture the one of the plurality of video recordings, the vehicle controller is also programmed to capture the one of the plurality of video recordings to the camera buffer. For each of the plurality of groups of pictures of the one of the plurality of video recordings, the vehicle controller is also programmed to identify at least one event in the group of pictures. For each of the plurality of groups of pictures of the one of the plurality of video recordings, the vehicle controller is also programmed to save metadata for the group of pictures in the camera buffer. The metadata includes an events field identifying the at least one event, a camera field identifying a camera which captured the group of pictures, and a timestamp field including a time at which the group of pictures was captured.

In another aspect of the present disclosure, the at least one event video file includes a plurality of event video files. To generate the plurality of event video files, the vehicle controller is also programmed to determine a plurality of unique events contained in the events field of the metadata of all of the plurality of groups of pictures in the one of the plurality of video recordings. To generate the plurality of event video files, the vehicle controller is also programmed to generate the plurality of event video files based on the plurality of groups of pictures in the one of the plurality of video recordings. Each of the plurality of event video files corresponds to one of the plurality of unique events.

In another aspect of the present disclosure, to generate one of the plurality of event video files corresponding to the one of the plurality of unique events, the vehicle controller is also programmed to generate the one of the plurality of event video files. The one of the plurality of event video files is a concatenation of a subset of the plurality of groups of pictures in the one of the plurality of video recordings. The events field of the metadata of each of the subset of the plurality of groups of pictures contains at least the one of the plurality of unique events. The camera field of the metadata of each of the subset of the plurality of groups of pictures is identical.

In another aspect of the present disclosure, to upload the plurality of event video files, the vehicle controller is also programmed to determine an event upload priority for each of the plurality of unique events. To upload the plurality of event video files, the vehicle controller is also programmed to determine a file upload priority for each of the plurality of event video files. To upload the plurality of event video files, the vehicle controller is also programmed to upload each of the plurality of event video files based at least in part on the event upload priority and the file upload priority.

In another aspect of the present disclosure, to upload the plurality of event video files, the vehicle controller is also programmed to determine a plurality of event upload time constraints. One of the plurality of event upload time constraints corresponds to each of the plurality of unique events. To upload the plurality of event video files, the vehicle controller is also programmed to determine a file upload time allocation for each of the plurality of event video files based at least in part on the plurality of event upload time constraints and the file upload priority for each of the plurality of event video files. To upload the plurality of event video files, the vehicle controller is also programmed to upload each of the plurality of event video files based at least in part on the event upload priority, file upload priority, and file upload time allocation for each of the plurality of event video files.

In another aspect of the present disclosure, to upload one of the plurality of event video files, the vehicle controller is also programmed to establish a connection with the remote server using the vehicle communication system. To upload one of the plurality of event video files, the vehicle controller is also programmed to upload a first group of pictures of the one of the plurality of event video files using the connection with the remote server. To upload one of the plurality of event video files, the vehicle controller is also programmed to measure a connection speed of the connection with the remote server. To upload one of the plurality of event video files, the vehicle controller is also programmed to determine an expected achievable data upload volume based at least in part on the file upload time allocation and the connection speed. To upload one of the plurality of event video files, the vehicle controller is also programmed to compare the expected achievable data upload volume to a remaining data volume of the one of the plurality of event video files. To upload one of the plurality of event video files, the vehicle controller is also programmed to adjust a bitrate of a second group of pictures of the one of the plurality of event video files in response to determining that the expected achievable data upload volume is less than the remaining data volume of the one of the plurality of event video files. The bitrate is adjusted based at least in part on the expected achievable data upload volume and the remaining data volume of the one of the plurality of event video files. To upload one of the plurality of event video files, the vehicle controller is also programmed to upload the second group of pictures of the one of the plurality of event video files.

In another aspect of the present disclosure, to upload the plurality of event video files, the vehicle controller is also programmed to identify a high-priority region of each of the plurality of event video files. To upload the plurality of event video files, the vehicle controller is also programmed to upload the high-priority region of each of the plurality of event video files.

According to several aspects, a method for processing a plurality of video recordings for a vehicle is provided. The method includes capturing one of the plurality of video recordings using a camera system. The one of the plurality of video recordings is stored to a camera buffer. The method also includes generating at least one event video file based on the one of the plurality of video recordings. The method also includes saving the at least one event video file to a video storage device. The method also includes uploading the at least one event video file from the video storage device to a remote server using a vehicle communication system.

In another aspect of the present disclosure, capturing the one of the plurality of video recordings also may include identifying a plurality of events in the one of the plurality of video recordings. Capturing the one of the plurality of video recordings also may include determining an importance level for each of the plurality of events in the one of the plurality of video recordings.

In another aspect of the present disclosure, generating the at least one event video file also may include generating the at least one event video file based on the one of the plurality of video recordings. The at least one event video file includes metadata identifying one of the plurality of events in the one of the plurality of video recordings having a highest importance level.

In another aspect of the present disclosure, capturing the one of the plurality of video recordings also may include capturing the one of the plurality of video recordings to the camera buffer. The one of the plurality of video recordings includes a plurality of groups of pictures. For each of the plurality of groups of pictures of the one of the plurality of video recordings, the method also includes identifying at least one event in the group of pictures. For each of the plurality of groups of pictures of the one of the plurality of video recordings, the method also includes saving metadata for the group of pictures in the camera buffer. The metadata includes an events field identifying the at least one event, a camera field identifying a camera which captured the group of pictures, and a timestamp field including a time at which the group of pictures was captured.

In another aspect of the present disclosure, the at least one event video file includes a plurality of event video files. Generating the plurality of event video files also may include determining a plurality of unique events contained in the events field of the metadata of all of the plurality of groups of pictures in the one of the plurality of video recordings. Generating the plurality of event video files also may include generating the plurality of event video files based on the plurality of groups of pictures in the one of the plurality of video recordings. Each of the plurality of event video files corresponds to one of the plurality of unique events.

In another aspect of the present disclosure, generating one of the plurality of event video files corresponding to the one of the plurality of unique events also may include generating the one of the plurality of event video files, where the one of the plurality of event video files is a concatenation of a subset of the plurality of groups of pictures in the one of the plurality of video recordings. The events field of the metadata of each of the subset of the plurality of groups of pictures contains at least the one of the plurality of unique events. The camera field of the metadata of each of the subset of the plurality of groups of pictures is identical.

In another aspect of the present disclosure, the at least one event video file includes a plurality of event video files. Uploading the plurality of event video files also comprises establishing a connection with the remote server using the vehicle communication system. Uploading the plurality of event video files also comprises uploading a first group of pictures of the one of the plurality of event video files using the connection with the remote server. Uploading the plurality of event video files also comprises measuring a connection speed of the connection with the remote server. Uploading the plurality of event video files also comprises determining an expected achievable data upload volume based at least in part on a file upload time allocation and the connection speed. Uploading the plurality of event video files also comprises comparing the expected achievable data upload volume to a remaining data volume of the one of the plurality of event video files. Uploading the plurality of event video files also comprises adjusting a bitrate of a second group of pictures of the one of the plurality of event video files in response to determining that the expected achievable data upload volume is less than the remaining data volume of the one of the plurality of event video files. The bitrate is adjusted based at least in part on the expected achievable data upload volume and the remaining data volume of the one of the plurality of event video files. Uploading the plurality of event video files also comprises uploading the second group of pictures of the one of the plurality of event video files.

According to several aspects, a system for processing a plurality of video recordings for a vehicle is provided. The system includes a camera system configured to capture video recordings of an environment surrounding the vehicle. The camera system includes a camera buffer configured to store video recordings. The system also includes a video storage device. The system also includes a vehicle communication system configured to communicate with a remote server. The system also includes a vehicle controller in electrical communication with the camera system, the video storage device, and the vehicle communication system. The vehicle controller is programmed to capture a video recording using the camera system. The one of the plurality of video recordings is stored to the camera buffer. The one of the plurality of video recordings includes a plurality of groups of pictures. The vehicle controller is also programmed to identify at least one event in the group of pictures. The vehicle controller is also programmed to save metadata for the group of pictures in the camera buffer. The metadata includes an events field identifying the at least one event, a camera field identifying a camera which captured the group of pictures, and a timestamp field including a time at which the group of pictures was captured. The vehicle controller is also programmed to determine a plurality of unique events contained in the events field of the metadata of all of the plurality of groups of pictures in the one of the plurality of video recordings. The vehicle controller is also programmed to generate a plurality of event video files based on the plurality of groups of pictures in the one of the plurality of video recordings. Each of the plurality of event video files corresponds to one of the plurality of unique events. Each of the plurality of event video files is a concatenation of a subset of the plurality of groups of pictures in the one of the plurality of video recordings. The vehicle controller is also programmed to save the plurality of event video files to the video storage device. The vehicle controller is also programmed to upload the plurality of event video files from the video storage device to the remote server using the vehicle communication system.

In another aspect of the present disclosure, to upload the plurality of event video files, the vehicle controller is also programmed to determine an event upload priority for each of the plurality of unique events. To upload the plurality of event video files, the vehicle controller is also programmed to determine a file upload priority for each of the plurality of event video files. To upload the plurality of event video files, the vehicle controller is also programmed to determine a plurality of event upload time constraints, where one of the plurality of event upload time constraints corresponds to each of the plurality of unique events. To upload the plurality of event video files, the vehicle controller is also programmed to determine a file upload time allocation for each of the plurality of event video files based at least in part on the plurality of event upload time constraints and the file upload priority for each of the plurality of event video files. To upload the plurality of event video files, the vehicle controller is also programmed to identify a high-priority region of each of the plurality of event video files. To upload the plurality of event video files, the vehicle controller is also programmed to upload the high-priority region of each of the plurality of event video files. To upload the plurality of event video files, the vehicle controller is also programmed to upload each of the plurality of event video files based at least in part on the event upload priority, file upload priority, and file upload time allocation for each of the plurality of event video files.

In another aspect of the present disclosure, to upload one of the plurality of event video files, the vehicle controller is also programmed to establish a connection with the remote server using the vehicle communication system. To upload one of the plurality of event video files, the vehicle controller is also programmed to upload a first group of pictures of the one of the plurality of event video files using the connection with the remote server. To upload one of the plurality of event video files, the vehicle controller is also programmed to measure a connection speed of the connection with the remote server. To upload one of the plurality of event video files, the vehicle controller is also programmed to determine an expected achievable data upload volume based at least in part on the file upload time allocation and the connection speed. To upload one of the plurality of event video files, the vehicle controller is also programmed to compare the expected achievable data upload volume to a remaining data volume of the one of the plurality of event video files. To upload one of the plurality of event video files, the vehicle controller is also programmed to adjust a bitrate of a second group of pictures of the one of the plurality of event video files in response to determining that the expected achievable data upload volume is less than the remaining data volume of the one of the plurality of event video files. The bitrate is adjusted based at least in part on the expected achievable data upload volume and the remaining data volume of the one of the plurality of event video files. To upload one of the plurality of event video files, the vehicle controller is also programmed to upload the second group of pictures of the one of the plurality of event video files.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
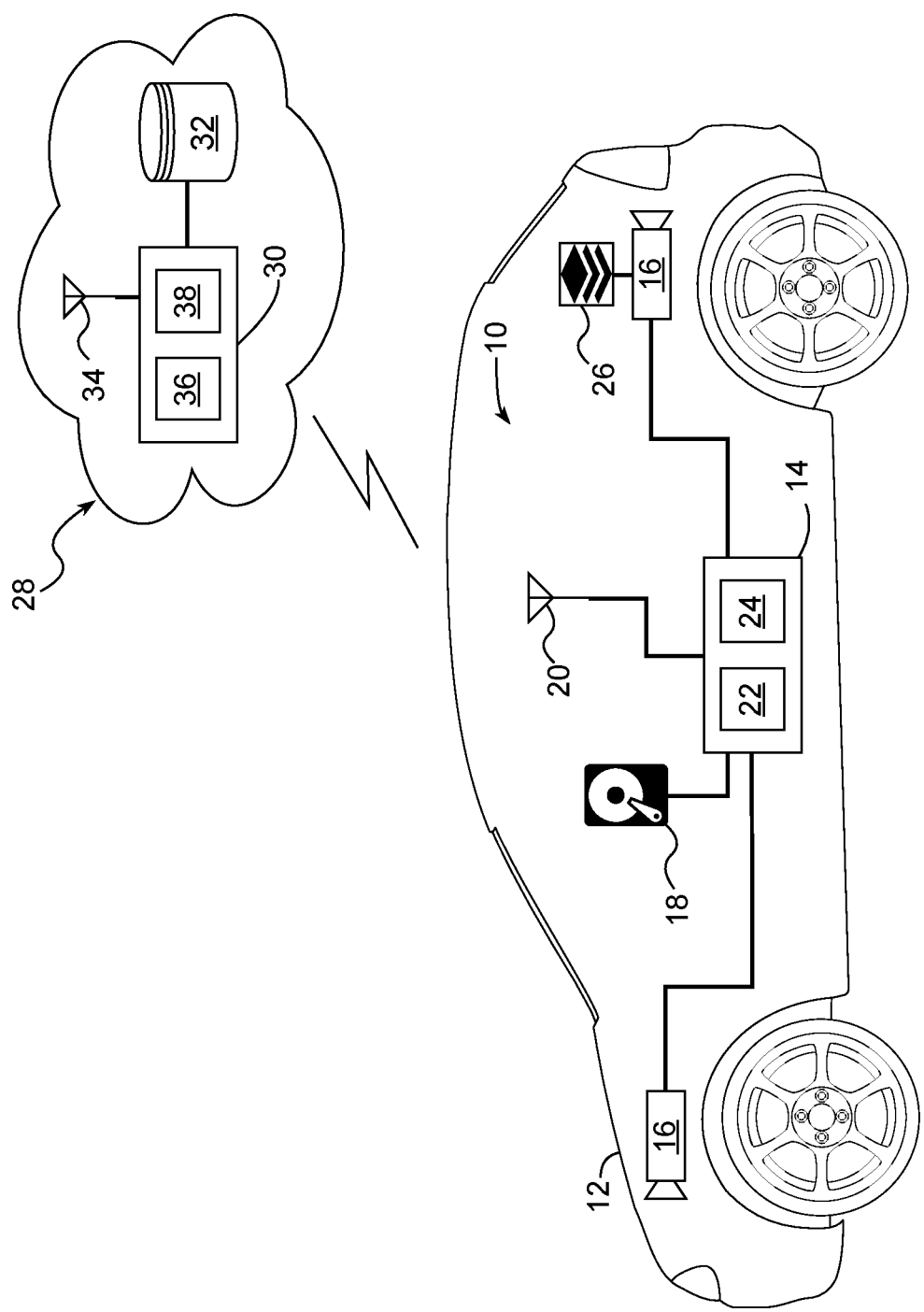
FIG. 1 is a system diagram of a system for processing a plurality of video recordings for a vehicle, according to an exemplary embodiment.

Referring to FIG. 1, system for processing a plurality of video recordings for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a camera system 16, a video storage device 18, and a vehicle communication system 20.

The vehicle controller 14 is used to implement a method 100 and a method 300 for processing a plurality of video recordings for a vehicle, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be interconnected with additional systems and/or controllers of the vehicle 12, allowing the vehicle controller 14 to access data such as, for example, speed, acceleration, braking, and steering angle of the vehicle 12.

The vehicle controller 14 is in electrical communication with the camera system 16, the video storage device 18, and the vehicle communication system 20. In an exemplary embodiment, the electrical communication is established using, for example, a CAN bus, a Wi-Fi network, a cellular data network, or the like. It should be understood that various additional wired and wireless techniques and communication protocols for communicating with the vehicle controller 14 are within the scope of the present disclosure.

The camera system 16 is used to capture images and/or video recordings of an environment surrounding the vehicle 12. In an exemplary embodiment, the camera system 16 includes a photo and/or video camera which is positioned to view the environment 24 surrounding of the vehicle 12. In a non-limiting example, the camera system 16 includes cameras affixed inside of the vehicle 12, for example, in a headliner of the vehicle 12, having a view through a windscreen of the vehicle 12. In another non-limiting example, the camera system 16 includes cameras affixed outside of the vehicle 12, for example, on a roof of the vehicle 12, having a view of the environment surrounding the vehicle 12.

In another exemplary embodiment, the camera system 16 is a surround view camera system including a plurality of cameras (also known as satellite cameras) arranged to provide a view of the environment adjacent to all sides of the vehicle 12. In a non-limiting example, the camera system 16 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 16 further includes an additional rear-view camera mounted near a center high mounted stop lamp of the vehicle 12.

In an exemplary embodiment, the camera system 16 further includes a camera buffer 26. The camera buffer 26 is used to temporality store video recordings captured by the camera system 16 during recording until the video recordings are processed and stored on the video storage device 18, as will be discussed in further detail below. In an exemplary embodiment, the camera buffer 26 is a volatile data storage device, such as, for example, random-access memory (RAM), including dynamic RAM (DRAM) and/or static RAM (SRAM). The camera buffer 26 is in electrical communication with each camera of the camera system 16 and the vehicle controller 14 as described above.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The video storage device 18 is used to store video recordings on the vehicle 12 for later retrieval. In an exemplary embodiment, the video storage device 18 is a non-volatile, persistent storage medium, such as, for example, a hard disk drive, a magnetic tape drive, a solid-state drive, and the like. In a non-limiting example, the video storage device 18 includes a solid-state drive (SSD) utilizing NAND flash to store video recordings in the form of digital data. In another non-limiting example, the video storage device 18 includes a hard-disk drive (HDD) utilizing a magnetizable material to store video recordings in the form of digital data. The video storage device 18 is in electrical communication with the vehicle controller 14 as described above.

The vehicle communication system 20 is used by the vehicle controller 14 to communicate with other systems external to the vehicle 12. For example, the vehicle communication system 20 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles.

With continued reference to FIG. 1, a remote server system is illustrated and generally indicated by reference number 28. The remote server system 28 includes a server controller 30 in electrical communication with a server database 32 and a server communication system 34. In a non-limiting example, the remote server system 28 is located in a server farm, datacenter, or the like, and connected to the internet. The server controller 30 includes at least one server processor 36 and a server non-transitory computer readable storage device or server media 38. The description of the type and configuration given above for the vehicle controller 14 also applies to the server controller 30. The description given above for the vehicle communication system 20 also applies to the server communication system 34. The server communication system 34 is used to communication with external systems, such as, for example, the vehicle controller 14 via the vehicle communication system 20.

Figure 2:
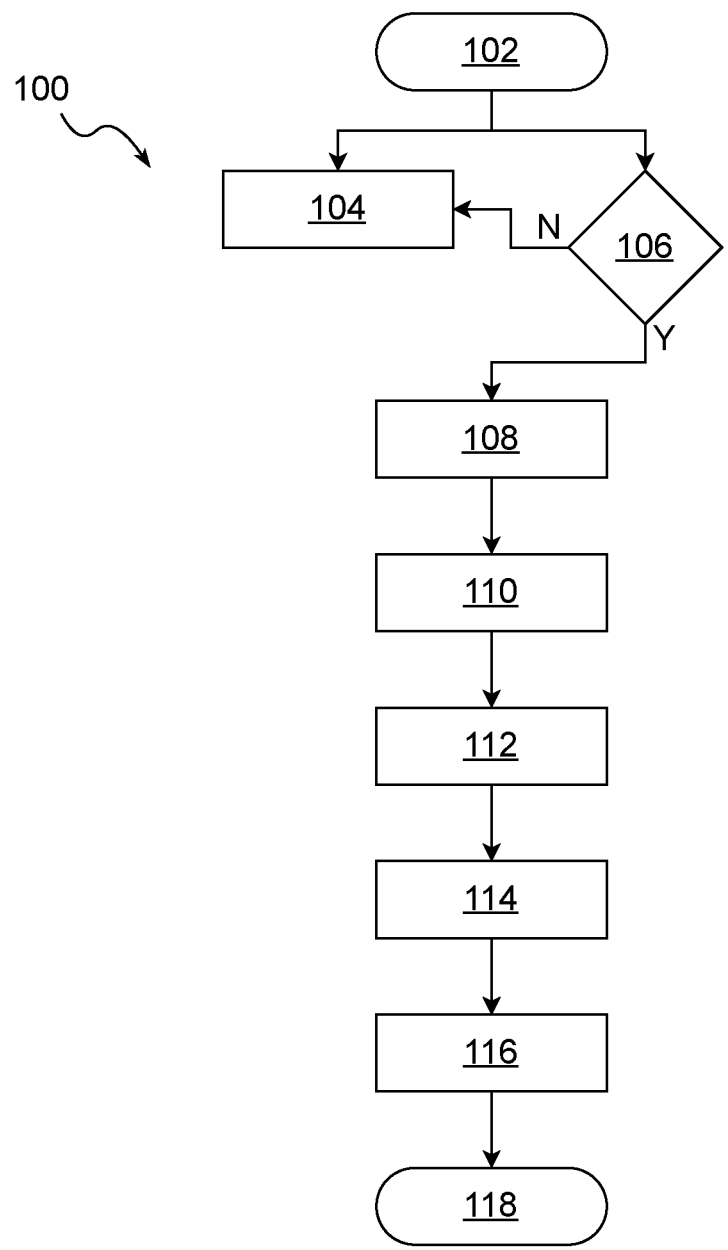
FIG. 2 is a flowchart of a method for processing a plurality of video recordings for a vehicle, according to a first exemplary embodiment.

Referring to FIG. 2, a flowchart of the method 100 for processing a plurality of video recordings for a vehicle is shown. The methods 100 begins at block 102 and proceeds to blocks 104 and 106.

At block 104, the vehicle controller 14 uses the camera system 16 to perpetually capture a video recording to the camera buffer 26. In an exemplary embodiment, when the camera buffer 26 is full, the video recording stored on the camera buffer 26 is overwritten with a new video recording.

At block 106, the vehicle controller 14 monitors the perpetual video recording being captured at block 104 and determines whether an activation event has occurred. In a non-limiting example, the activation event includes one of a detected event and an occupant-initiated event. The detected event includes, for example, a collision and/or near-collision between the vehicle 12 and/or other vehicles, pedestrians, or animals, a theft and/or attempted theft of the vehicle 12 and/or items within the vehicle 12, a vandalism and/or attempted vandalism of the vehicle 12 and/or other vehicles, an unusual event such as a natural disaster, a road-rage incident involving the vehicle 12 and/or other vehicles, a traffic law violation of the vehicle 12 and/or other vehicles, and/or the like. In an exemplary embodiment, additional vehicle sensors, such as, for example, accelerometers, vision sensors (e.g., the camera system 16), and/or the like are used to detect the detection event.

The occupant-initiated event is an event which is manually activated by an occupant of the vehicle 12. In an exemplary embodiment, the occupant of the vehicle 12 uses a human-interface device (HID), such as, for example, a button (e.g., an electromechanical button, a capacitive button, and/or the like), a touchscreen, a rotary knob, and/or the like to initiate the occupant-initiated event.

At block 106, if the activation event has not occurred, the method 100 returns to block 104 and continues the video recording. If the activation event has occurred, the method 100 proceeds to block 108.

At block 108, the vehicle controller 14 identifies a plurality of events in the video recording captured at block 104. The plurality of events includes a detected event or an occupant-initiated event as discussed above. After block 108, the method 100 proceeds to block 110.

At block 110, the vehicle controller 14 determines an importance level for each of the plurality of events identified at block 108. In an exemplary embodiment, the importance level is determined based on the nature of each of the plurality of events. In a non-limiting example, a collision involving the vehicle 12 is determined to have a higher importance level than a collision involving only other vehicles, and not the vehicle 12. In another non-limiting example, a collision involving the vehicle 12 is determined to have a higher importance level than a road-rage incident involving the vehicle 12. In an exemplary embodiment, the media 24 of the vehicle controller 14 includes a lookup table including a plurality of possible events and a corresponding predetermined importance level for each of the plurality of possible events. In another exemplary embodiment, the importance level for each of the plurality of possible events in the lookup table is configurable by the occupant of the vehicle 12 using an HID (e.g., a touchscreen display). Therefore, the lookup table is used by the vehicle controller 14 to determine the importance level for each of the plurality of events. After block 110, the method 100 proceeds to block 112.

At block 112, the vehicle controller 14 generates at least one event video file based on the video recording captured at block 104. In an exemplary embodiment, the event video file is a digital video file including a view from the camera system 16 of at least one event. In a non-limiting example, the event video file may include a subsection of the video recording captured at block 104, for example, thirty seconds before the occurrence of the first event identified at block 108 and sixty seconds after the occurrence of the last event identified at block 108. In an exemplary embodiment, the event video file includes metadata identifying one of the plurality of events identified at block 108. In a non-limiting example, the metadata identifies the one of the plurality of events having a highest importance level, as determined at block 110. For example, if a video recording includes both a collision and a road-rage incident, and the collision event has a higher importance level than the road-rage incident, the metadata for the event video file will identify the collision. After block 112, the method 100 proceeds to block 114.

At block 114, the event video file generated at block 112 is saved in the video storage device 18 such that the camera buffer 26 is available for further recording. In an exemplary embodiment, the event video file is categorized in the video storage device 18 according to the metadata discussed above in reference to block 112. After block 114, the method 100 proceeds to block 116.

At block 116, the event video file saved at block 114 is uploaded from the video storage device 18 to the remote server system 28 using the vehicle communication system 20. In an exemplary embodiment, the vehicle communication system 20 establishes a connection with the server communication system 34 of the remote server system 28 and uploads the event video file to the remote server system 28. In a non-limiting example, the remote server system 28 saves the uploaded event video file in the server database 32. In an exemplary embodiment, the event video file is categorized in the sever database 32 according to the metadata discussed above in reference to block 112. In an exemplary embodiment, the event video file is subsequently retrieved from the server system 28 for further action. For example, the occupant may subsequently use a mobile device (e.g., smartphone, tablet, personal computer, and the like) to establish a connection with the remote server system 28 and view the event video file.

It should be understood that a delay-time (e.g., multiple seconds, multiple minutes, multiple hours, and/or the like)

may occur between execution of blocks 114 and 116 of the method 100. In other words, the event video file is not necessarily immediately be uploaded to the remote server system 28, and may instead be stored for the delay-time in the video storage device 18 before being uploaded at block 116.

After block 116, the method 100 proceeds to enter a standby state at block 118. In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds.

Figure 3:
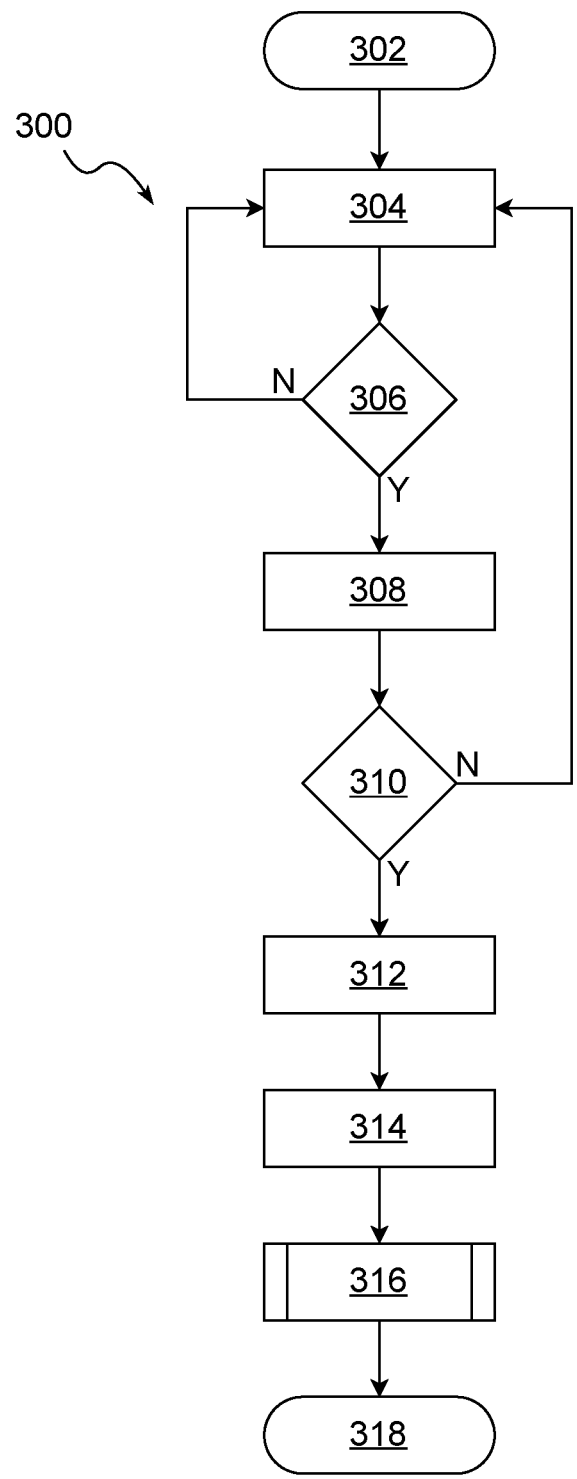
FIG. 3 is a flowchart of a method for processing a plurality of video recordings for a vehicle, according to a second exemplary embodiment.

Referring to FIG. 3, a flowchart of the method 300 for processing a plurality of video recordings for a vehicle is shown. The method 300 begins at block 302 and proceeds to block 304. At block 304, the vehicle controller 14 uses the camera system 16 to capture a group of pictures (GOP) to the camera buffer 26. In the scope of the present disclosure, a GOP is a collection of successive pictures within an encoded video stream. Each encoded video stream includes a plurality of GOPs. Therefore, the video recordings captured by the camera system 16 include a plurality of GOPs. After block 304, the method 300 proceeds to block 306.

At block 306, the vehicle controller 14 identifies events in the GOP captured at block 304. In the scope of the present disclosure, the events identified at block 306 include at least one of a detected event and an occupant-initiated event. The detected event includes, for example, a collision and/or near-collision between the vehicle 12 and/or other vehicles, pedestrians, or animals, a theft and/or attempted theft of the vehicle 12 and/or items within the vehicle 12, a vandalism and/or attempted vandalism of the vehicle 12 and/or other vehicles, an unusual event such as a natural disaster, a road-rage incident involving the vehicle 12 and/or other vehicles, a traffic law violation of the vehicle 12 and/or other vehicles, and/or the like. In an exemplary embodiment, additional vehicle sensors, such as, for example, accelerometers, vision sensors (e.g., the camera system 16), and/or the like are used to detect the detection event.

The occupant-initiated event is an event which is manually activated by an occupant of the vehicle 12. In an exemplary embodiment, the occupant of the vehicle 12 uses a human-interface device (HID), such as, for example, a button (e.g., an electromechanical button, a capacitive button, and/or the like), a touchscreen, a rotary knob, and/or the like to initiate the occupant-initiated event.

If no events are identified at block 306, the method 300 returns to block 304 to capture another GOP into the camera buffer 26. If at least one event is identified at block 306, the method 300 proceeds to block 308.

At block 308, the vehicle controller 14 saves metadata for the GOP captured at block 304 to the camera buffer 26. In an exemplary embodiment, the metadata includes a plurality of fields. Each of the plurality of fields contains information about the GOP. In a non-limiting example, the metadata includes an events field, a camera field, and a timestamp field. The events field includes the events identified at block 306. The camera field identifies which of the plurality of cameras of the camera system 16 captured the GOP. In a non-limiting example, each of the plurality of cameras of the camera system 16 is assigned a unique identifier (UID), and the UID of the one plurality of cameras which captured the GOP is stored in the camera field of the metadata for that GOP. The timestamp includes a time which the GOP was captured. After block 308, the method 300 proceeds to block 310.

At block 310, if the camera buffer 26 is not full, the method 300 returns to block 304 to capture a subsequent GOP. Therefore, the camera buffer 26 may contain a plurality of GOPs (also referred to as a video recording), with metadata corresponding to each of the plurality of GOPs. If the camera buffer 26 is full, the method 300 proceeds to block 312.

At block 312, the vehicle controller 14 determines a plurality of unique events included in the metadata of all of the plurality of GOPs in the camera buffer 26. For example, if the plurality of GOPs includes two GOPs, the first GOP having metadata with "vehicle collision" in the events field, and the second GOP having metadata with "vehicle collision, road-rage incident" in the events field, the plurality of unique events is "vehicle collision, road-rage incident". After block 312, the method 300 proceeds to block 314.

At block 314, the vehicle controller 14 generates a plurality of event video files, each of the plurality of event video files corresponding to a given one of the plurality of unique events determined at block 312. Each of the plurality of event video files is saved in the video storage device 18. In an exemplary embodiment, to generate one of the plurality of event video files corresponding to the given one of the plurality of events, the vehicle controller 14 concatenates a subset of the plurality of GOPs in the camera buffer 26. The events field of the metadata of each GOP of the subset of the plurality of GOPs contains the given one of the plurality of events. Furthermore, the camera field of the metadata of each GOP of the subset of the plurality of GOPs is identical (i.e., each GOP of the subset of the plurality of GOPs was captured by the same camera). The subset of the plurality of GOPs are concatenated in chronological order based on the timestamp field of the metadata of each of the plurality of GOPs. After block 314, the method 300 proceeds to block 316.

At block 316, each of the plurality of event video files generated at block 314 are uploaded from the video storage device 18 to the remote server system 28, as will be discussed in greater detail in reference to FIG. 4 below. It should be understood that a delay-time (e.g., multiple seconds, multiple minutes, multiple hours, and/or the like) may occur between execution of blocks 314 and 316 of the method 300. In other words, the event video file is not necessarily immediately uploaded to the remote server system 28 and may instead be stored for the delay-time in the video storage device 18 before being uploaded at block 316. After block 316, the method 300 proceeds to enter a standby state at block 318.

In an exemplary embodiment, the controller 14 repeatedly exits the standby state 318 and restarts the method 300 at block 302. In a non-limiting example, the controller 14 exits the standby state 318 and restarts the method 300 on a timer, for example, every three hundred milliseconds.

Figure 4:
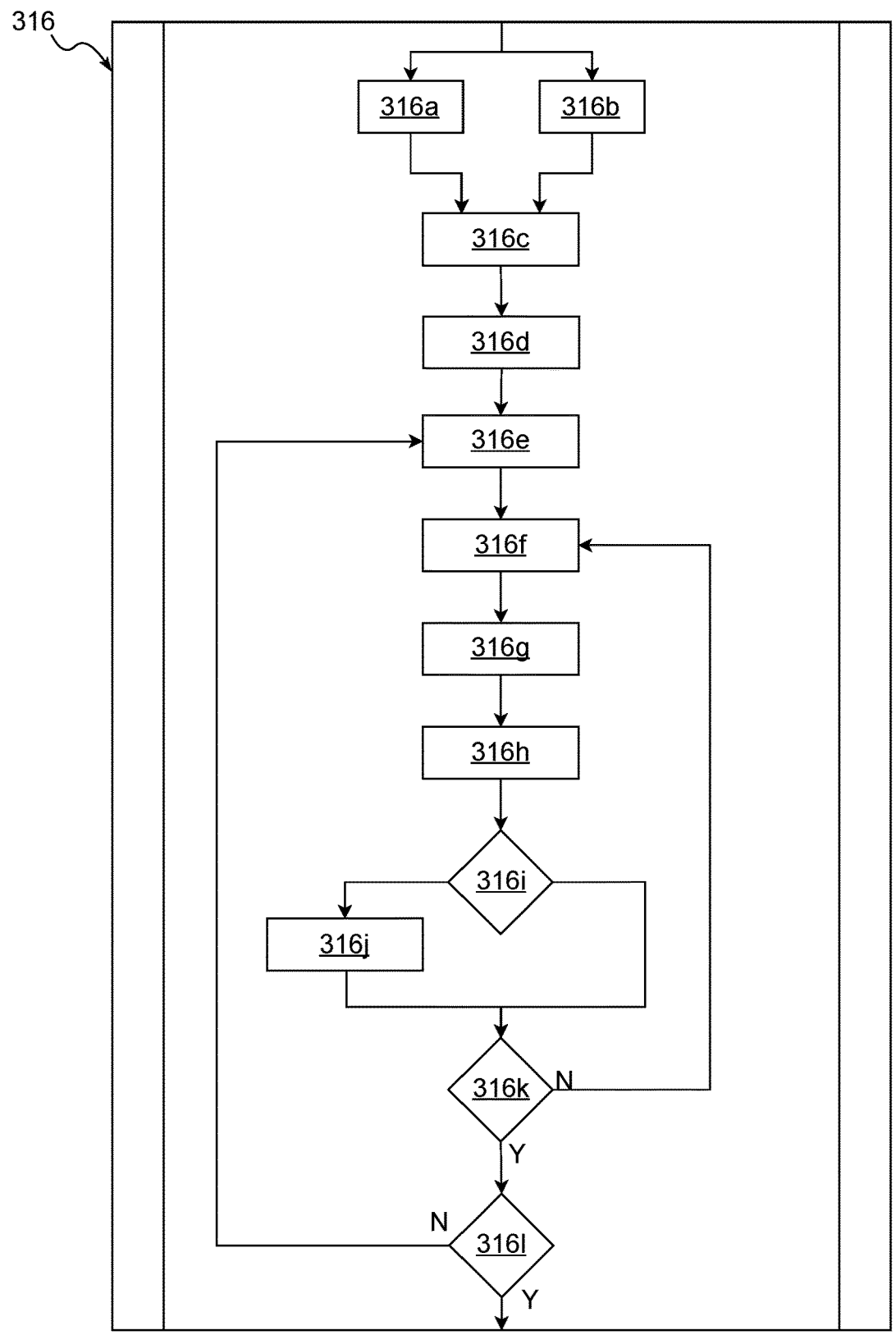
FIG. 4 is a method for uploading a plurality of event video files to a remote server system, according to an exemplary embodiment.

Referring to FIG. 4, a flowchart of an exemplary embodiment of block 316 discussed above is shown. The exemplary embodiment of block 316 begins at blocks 316a and 316b. At block 316a, the vehicle controller 14 determines a file upload priority for each of the plurality of event video files generated at block 314. In an exemplary embodiment, the file upload priority is determined based at least in part on how visible each of the plurality unique events is in each of the plurality of event video files. For example, if a first event video file shows a complete view of an event (e.g., a front camera of the camera system 16 shows a complete view of a front-end collision with the vehicle 12), the first event video file showing the complete view is determined to have a highest file upload priority. In another example, if a second event video file shows a partial view of an event (e.g., a side camera of the camera system 16 shows a partial view of a front-end collision with the vehicle 12), the second event video file showing the partial view is determined to have a lower file upload priority relative to the first event video file. In yet another example, if a third event video file shows no view of an event (e.g., a rear camera of the camera system 16 shows no view of a front-end collision with the vehicle 12), the third event video file showing no view is determined to have a lowest file upload priority relative to the first and second event video files. In another exemplary embodiment, each of the plurality of event video files corresponding to one of the plurality of unique events are determined to have the same file upload priority, regardless of which camera of the camera system 16 was used to record each of the plurality of event video files. After block 316a, the exemplary embodiment of block 316 proceeds to block 316c.

At block 316b, the vehicle controller 14 determines an event upload priority for each of the plurality of unique events determined at block 312. In the scope of the present disclosure, the event upload priority is determined based at least in part the importance and/or time-sensitivity of each of the plurality of unique events. For example, if a first of the plurality of unique events is a front-end collision involving the vehicle 12, the first of the plurality of unique events is determined to have a highest event upload priority. In another example, if a second of the plurality of unique events is an attempted theft of the vehicle 12, the second of the plurality of unique events is determined to have a lower event upload priority relative to the first of the plurality of unique events. In yet another example, if a third of the plurality of unique events is a minor traffic law violation, the third of the plurality of unique events is determined to have a lowest event upload priority relative to the first and second of the plurality of unique events. In an exemplary embodiment, the media 24 of the vehicle controller 14 includes a lookup table including a plurality of possible events and a corresponding predetermined event upload priority for each of the plurality of possible events. After block 316b, the exemplary embodiment of block 316 proceeds to block 316c.

At block 316c, the vehicle controller 14 determines a plurality of event upload time constraints, each of the plurality of event upload time constraints corresponding to one of the plurality of unique events determined at block 312. In the scope of the present disclosure, the event upload time constraint is a length of time within which all event video files corresponding to one of the plurality of unique events must be uploaded to the remote server system 28. For example, if a first of the plurality of events is a vehicular collision, the event upload time constraint corresponding to the first of the plurality of events is equal to a police response time (e.g., ten minutes), such that a police officer may review the event video files of the vehicular collision upon arrival. In an exemplary embodiment, the event upload time constraint for each of the plurality of unique events is determined based at least in part on the event upload priority for each of the plurality of unique events determined at block 316b. In another exemplary embodiment, the media 24 of the vehicle controller 14 includes a lookup table including a plurality of possible events and a corresponding predetermined event time constraint for each of the plurality of possible events. After block 316c, the exemplary embodiment of block 316 proceeds to block 316d.

At block 316d, the vehicle controller 14 determines a plurality of file upload time allocations, each of the plurality of file upload time allocations corresponding to one of the plurality of event video files. In the scope of the present disclosure, the file upload time allocation is a length of time allocated to upload an event video file. In an exemplary embodiment, the plurality of file upload time allocations is determined based at least in part on the plurality of event upload time constraints determined at block 316c, the file upload priority for each of the plurality of event video files determined at block 316a, and a file size of each of the plurality of event video files. In a non-limiting example, for an exemplary event having three corresponding event video files, the following formulae are used:

$$A_1 = \frac{S_1 T}{S_1 + \alpha S_2 + \beta S_3} \quad (1)$$

$$A_2 = \frac{\alpha S_2 T}{S_1 + \alpha S_2 + \beta S_3} \quad (2)$$

$$A_3 = \frac{\beta S_3 T}{S_1 + \alpha S_2 + \beta S_3} \quad (3)$$

The variable $A_1$ is the file upload time allocation for a first of the three corresponding event video files. The variable $A_2$ is the file upload time allocation for a second of the three corresponding event video files. The variable $A_3$ is the file upload time allocation for a third of the three corresponding event video files. The variable $T$ is one of the plurality of event upload time constraints corresponding to the exemplary event, as determined at block 316c. The variable $S_1$ is the file size for the first of the three corresponding event video files. The variable $S_2$ is the file size for the second of the three corresponding event video files. The variable $S_3$ is the file size for the third of the three corresponding event video files. The constant $\alpha$ is a first file upload time allocation constant for a second of the three corresponding event video files. The constant $\beta$ is a second file upload time allocation constant for a third of the three corresponding event video files. The constants $\alpha$ and $\beta$ are both between zero and one, where $\alpha$ is larger than $\beta$. The first of the three corresponding event video files is one of the three corresponding event video files determined to have a highest file upload priority at block 316a. The second of the three corresponding event video files is one of the three corresponding event video files determined to have a lower upload priority relative to the first of the three corresponding event video files as determined at block 316a. The third of the three corresponding event video files is one of the three corresponding event video files determined to have a lowest file upload priority relative to the first and second of the three corresponding event video files as determined at block 316a. After block 316d, the exemplary embodiment of block 316 proceeds to block 316e.

At block 316e, the vehicle controller 14 identifies one of the plurality of event video files to upload to the remote server system 28. In a first exemplary embodiment, to identify one of the plurality of event video files to upload, the vehicle controller 14 first identifies a plurality of un-uploaded event video files, including each of the plurality of event video files which have not yet been uploaded to the remote server system 28. The vehicle controller 14 then identifies a subset of the plurality of un-uploaded event video files having a highest file upload priority as determined at block 316a. The one of the plurality of event video files to upload is identified as one of the subset of the plurality of un-uploaded event video files corresponding to one of the plurality of unique events having a highest event upload priority as determined at block 316b.

In a second exemplary embodiment, to identify one of the plurality of event video files to upload, the vehicle controller 14 first identifies the plurality of un-uploaded event video files. The vehicle controller 14 then identifies a subset of the plurality of un-uploaded event video files corresponding to one of the plurality of unique events having a highest event upload priority as determined at block 316b. The one of the plurality of event video files to upload is identified as one of the subset of the plurality of un-uploaded event video files having a highest file upload priority as determined at block 316a.

The first and second exemplary embodiments described above further may include identifying a high-priority region of one of the plurality of event video files to upload. In the scope of the present disclosure, the high-priority region is a subsection of one of the plurality of event video files. In a non-limiting example, the high-priority region includes the event which is the subject of the event video file and a predetermined region of the event video file before and after the event. For example, if an exemplary event occurs at a timestamp of three minutes in an exemplary event video file which is ten minutes long, the high-priority region is, for example, a region of the exemplary event video file from a timestamp of two minutes and thirty seconds until four minutes. The high-priority region of each of the plurality of event video files is uploaded first to allow a useful subsection of each of the plurality of event video files to be uploaded quickly. After uploading the high-priority region of each of the plurality of event video files, the exemplary embodiment of block 316 may repeat to upload the full version of each of the plurality of event video files. After block 316e, the exemplary embodiment of block 316 proceeds to block 316f.

At block 316f, the vehicle controller 14 uses the vehicle communication system 20 establish a connection between the system 10 and the remote server system 28 and to upload a GOP of the event video file identified at block 316e to the remote server system 28. After block 316f, the exemplary embodiment of block 316 proceeds to block 316g.

At block 316g, the vehicle controller 14 uses the vehicle communication system 20 to measure a connection speed of the connection between the system 10 and the remote server system 28. In an exemplary embodiment, the connection speed is an upload speed measured in megabits per second (e.g., fifteen megabits per second). In a further exemplary embodiment, the vehicle communication system 20 performed multiple connection speed measurements over time and calculates a moving average. After block 316g, the exemplary embodiment of block 316 proceeds to block 316h.

At block 316h, the vehicle controller 14 determines an expected achievable data upload volume. In the scope of the present disclosure, the expected achievable data upload volume is a volume of data which is expected to be uploaded within a remaining time of the upload time allocation for the event video file being uploaded (i.e., the event video file identified at block 316e). The expected achievable data upload volume is determined based on the connection speed measured at block 316g and the remaining time of the upload time allocation for the event video file being uploaded. For example, if the upload time allocation for the event video file being uploaded is sixty seconds, and twenty seconds have elapsed, the remaining time of the upload time allocation for the event video file being uploaded is forty seconds. If the connection speed is ten megabits per second, the expected achievable data upload volume is four hundred megabits. After block 316h, the exemplary embodiment of block 316 proceeds to block 316i.

At block 316i, the vehicle controller 14 compares the expected achievable data upload volume determined at block 316h to a remaining file size (i.e., a remaining data volume) of the event video file being uploaded (i.e., the event video file identified at block 316e). The remaining file size is a file size of that portion of the event video file which has not yet been uploaded. If the expected achievable data upload volume is less than the remaining file size, the exemplary embodiment of block 316 proceeds to block 316j. If the expected achievable data upload volume is greater than or equal to the remaining file size, the exemplary embodiment of block 316 proceeds to block 316k.

At block 316j, the vehicle controller 14 adjusts a bitrate of a subsequent GOP of the event video file being uploaded (i.e., the event video file identified at block 316e). In a non-limiting example, reducing the bitrate of a subsequent GOP results in a reduction of the remaining file size of the event video file being uploaded. In an exemplary embodiment, the bitrate is reduced such that the remaining file size of the event video file being uploaded is less than or equal to the expected achievable data upload volume determined at block 316h. After block 316j, the exemplary embodiment of block 316 proceeds to block 316k.

At block 316k, the vehicle controller 14 determines whether the event video file being uploaded (i.e., the event video file identified at block 316e) has been fully uploaded. In other words, the vehicle controller 14 determines whether every GOP of the event video file being uploaded has been uploaded to the remote server system 28. If the event video file being uploaded has not been fully uploaded, the exemplary embodiment of block 316 returns to block 316f to upload the subsequent GOP of the event video file being uploaded. If the event video file being uploaded has been fully uploaded, the exemplary embodiment of block 316 proceeds to block 316l.

At block 316l, the vehicle controller 14 determines whether all of the plurality of event video files generated at block 314 have been uploaded. If all of the plurality of event video files have not been uploaded, the exemplary embodiment of block 316 returns to block 316e to identify one of the plurality of event video files to upload to the remote server system 28. If all of the plurality of event video files have been uploaded, the exemplary embodiment of block 316 is concluded and the method 300 resumes.

The system 10 and methods 100 and 300 of the present disclosure offers several advantages. By saving metadata for each GOP identifying events occurring in the GOP, multiple event recording and categorization is enabled while minimizing the required size of the camera buffer 26. Using the upload method discussed in reference to block 316, event video files are uploaded within a time constraint, even when network connection quality varies during the upload process.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A system for processing a plurality of video recordings for a vehicle, the system comprising:
   a camera system configured to capture the plurality of video recordings of an environment surrounding the vehicle, wherein the camera system includes a camera buffer configured to store the plurality of video recordings;
a video storage device;
a vehicle communication system configured to communicate with a remote server; and
a vehicle controller in electrical communication with the camera system, the video storage device, and the vehicle communication system, wherein the vehicle controller is programmed to:
 capture one of the plurality of video recordings using the camera system, wherein the one of the plurality of video recordings is stored to the camera buffer, wherein the one of the plurality of video recordings includes a plurality of groups of pictures, and wherein to capture the one of the plurality of video recordings, the vehicle controller is further programmed to:
  capture the one of the plurality of video recordings to the camera buffer, wherein for each of the plurality of groups of pictures of the one of the plurality of video recordings, the vehicle controller is further programmed to:
   identify at least one event in the group of pictures; and
   save metadata for the group of pictures in the camera buffer, wherein the metadata includes an events field identifying the at least one event, a camera field identifying a camera which captured the group of pictures, and a timestamp field including a time at which the group of pictures was captured;
 generate at least one event video file based on the one of the plurality of video recordings, wherein the at least one event video file includes a plurality of event video files, and wherein to generate the plurality of event video files, the vehicle controller is further programmed to:
  determine a plurality of unique events contained in the events field of the metadata of all of the plurality of groups of pictures in the one of the plurality of video recordings; and
  generate the plurality of event video files based on the the plurality of groups of pictures in the one of the plurality of video recordings, wherein each of the plurality of event video files corresponds to one of the plurality of unique events, wherein to generate one of the plurality of event video files corresponding to the one of the plurality of unique events, the vehicle controller is further programmed to:
   generate the one of the plurality of event video files, wherein the one of the plurality of event video files is a concatenation of a subset of the plurality of groups of pictures in the one of the plurality of video recordings, wherein the events field of the metadata of each of the subset of the plurality of groups of pictures contains at least the one of the plurality of unique events, and wherein the camera field of the metadata of each of the subset of the plurality of groups of pictures is identical;
 save the at least one event video file to the video storage device; and
 upload the at least one event video file from the video storage device to the remote server using the vehicle communication system.

2. The system of claim 1, wherein to capture the one of the plurality of video recordings, the vehicle controller is further programmed to:
 identify a plurality of events in the one of the plurality of video recordings; and
 determine an importance level for each of the plurality of events in the one of the plurality of video recordings.

3. The system of claim 2, wherein to generate the at least one event video file, the vehicle controller is further programmed to:
 generate the at least one event video file based on the one of the plurality of video recordings, wherein the at least one event video file includes metadata identifying one of the plurality of events in the one of the plurality of video recordings having a highest importance level.

4. The system of claim 1, wherein to upload the plurality of event video files, the vehicle controller is further programmed to:
 determine an event upload priority for each of the plurality of unique events;
 determine a file upload priority for each of the plurality of event video files; and
 upload each of the plurality of event video files based at least in part on the event upload priority and the file upload priority.

5. The system of claim 4, wherein to upload the plurality of event video files, the vehicle controller is further programmed to:
 determine a plurality of event upload time constraints, wherein one of the plurality of event upload time constraints corresponds to each of the plurality of unique events; and
 determine a file upload time allocation for each of the plurality of event video files based at least in part on the plurality of event upload time constraints and the file upload priority for each of the plurality of event video files; and
 upload each of the plurality of event video files based at least in part on the event upload priority, file upload priority, and file upload time allocation for each of the plurality of event video files.

6. The system of claim 5, wherein to upload one of the plurality of event video files, the vehicle controller is further programmed to:
 establish a connection with the remote server using the vehicle communication system;
 upload a first group of pictures of the one of the plurality of event video files using the connection with the remote server;
 measure a connection speed of the connection with the remote server;
 determine an expected achievable data upload volume based at least in part on the file upload time allocation and the connection speed;
 compare the expected achievable data upload volume to a remaining data volume of the one of the plurality of event video files;
 adjust a bitrate of a second group of pictures of the one of the plurality of event video files in response to determining that the expected achievable data upload volume is less than the remaining data volume of the one of the plurality of event video files, wherein the bitrate is adjusted based at least in part on the expected achievable data upload volume and the remaining data volume of the one of the plurality of event video files; and upload the second group of pictures of the one of the plurality of event video files.

7. The system of claim 4, wherein to upload the plurality of event video files, the vehicle controller is further programmed to:
identify a high-priority region of each of the plurality of event video files; and
upload the high-priority region of each of the plurality of event video files.

8. The system of claim 1, wherein to capture one of the plurality of video recordings using the camera system, the vehicle controller is further programmed to:
overwrite the camera buffer with a new video recording in response to determining that the camera buffer is full.

9. The system of claim 1, wherein the at least one event includes a detected event, and wherein the detected event includes at least one of: a collision and a near collision.

10. The system of claim 1, wherein the at least one event includes an occupant-initiated event, and wherein the occupant-initiated event is manually activated by an occupant of the vehicle.

11. A method for processing a plurality of video recordings for a vehicle, the method comprising:
capturing one of the plurality of video recordings to a camera buffer using a camera system, wherein the one of the plurality of video recordings includes a plurality of groups of pictures, and wherein for each of the plurality of groups of pictures of the one of the plurality of video recordings, the method further includes:
identifying at least one event in the group of pictures; and
saving metadata for the group of pictures in the camera buffer, wherein the metadata includes an events field identifying the at least one event, a camera field identifying a camera which captured the group of pictures, and a timestamp field including a time at which the group of pictures was captured;
determining a plurality of unique events contained in the events field of the metadata of all of the plurality of groups of pictures in the one of the plurality of video recordings; and
generating a plurality of event video files based on the plurality of groups of pictures in the one of the plurality of video recordings, wherein each of the plurality of event video files corresponds to one of the plurality of unique events, wherein generating one of the plurality of event video files corresponding to the one of the plurality of unique events further comprises:
generating the one of the plurality of event video files, wherein the one of the plurality of event video files is a concatenation of a subset of the plurality of groups of pictures in the one of the plurality of video recordings, wherein the events field of the metadata of each of the subset of the plurality of groups of pictures contains at least the one of the plurality of unique events, and wherein the camera field of the metadata of each of the subset of the plurality of groups of pictures is identical;
saving the plurality of event video files to a video storage device; and
uploading the plurality of event video files from the video storage device to a remote server using a vehicle communication system.

12. The method of claim 11, wherein capturing the one of the plurality of video recordings further comprises:
identifying a plurality of events in the one of the plurality of video recordings; and
determining an importance level for each of the plurality of events in the one of the plurality of video recordings.

13. The method of claim 12, wherein generating the plurality of event video files at least one event video file further comprises:
generating the plurality of event video files based on the one of the plurality of video recordings, wherein the plurality of event video files include metadata identifying one of the plurality of events in the one of the plurality of video recordings having a highest importance level.

14. The method of claim 11, wherein uploading the plurality of event video files further comprises:
establishing a connection with the remote server using the vehicle communication system;
uploading a first group of pictures of the one of the plurality of event video files using the connection with the remote server;
measuring a connection speed of the connection with the remote server;
determining an expected achievable data upload volume based at least in part on a file upload time allocation and the connection speed;
comparing the expected achievable data upload volume to a remaining data volume of the one of the plurality of event video files;
adjusting a bitrate of a second group of pictures of the one of the plurality of event video files in response to determining that the expected achievable data upload volume is less than the remaining data volume of the one of the plurality of event video files, wherein the bitrate is adjusted based at least in part on the expected achievable data upload volume and the remaining data volume of the one of the plurality of event video files; and
uploading the second group of pictures of the one of the plurality of event video files.

15. The method of claim 11, capturing one of the plurality of video recordings using the camera system further comprises:
overwriting the camera buffer with a new video recording in response to determining that the camera buffer is full.

16. The method of claim 11, wherein identifying the at least one event further comprises:
identifying the at least one event in the group of pictures, wherein the at least one event includes a detected event, and wherein the detected event includes at least one of: a collision and a near collision.

17. The method of claim 11, wherein identifying the at least one event further comprises:
identifying the at least one event in the group of pictures, wherein the at least one event includes an occupant-initiated event, and wherein the occupant-initiated event is manually activated by an occupant of the vehicle.

18. A system for processing a plurality of video recordings for a vehicle, the system comprising:
a surround view camera system including a plurality of cameras configured to capture video recordings of an environment surrounding the vehicle, wherein the surround view camera system includes a camera buffer configured to store video recordings;
a solid-state video storage device;
a vehicle communication system configured to communicate with a remote server; and
a vehicle controller in electrical communication with the surround view camera system, the solid-state video storage device, and the vehicle communication system, wherein the vehicle controller is programmed to:

capture one of the plurality of video recordings using the surround view camera system, wherein the one of the plurality of video recordings is stored to the camera buffer, and wherein the one of the plurality of video recordings includes a plurality of groups of pictures;

identify at least one event in a group of pictures of the plurality of groups of pictures;

save metadata for the group of pictures in the camera buffer, wherein the metadata includes an events field identifying the at least one event, a camera field identifying a camera which captured the group of pictures, and a timestamp field including a time at which the group of pictures was captured;

determine a plurality of unique events contained in the events field of the metadata of all of the plurality of groups of pictures in the one of the plurality of video recordings;

generate a plurality of event video files based on the plurality of groups of pictures in the one of the plurality of video recordings, wherein each of the plurality of event video files corresponds to one of the plurality of unique events, and wherein each of the plurality of event video files is a concatenation of a subset of the plurality of groups of pictures in the one of the plurality of video recordings;

save the plurality of event video files to the solid-state video storage device;

upload the plurality of event video files from. the solid-state video storage device to the remote server using the vehicle communication system;

determine an event upload priority for each of the plurality of unique events;

determine a file upload priority for each of the plurality of event video files;

determine a plurality of event upload time constraints, wherein one of the plurality of event upload time constraints corresponds to each of the plurality of unique events;

determine a file upload time allocation for each of the plurality of event video files based at least in part on the plurality of event upload time constraints and the file upload priority for each of the plurality of event video files;

identify a high-priority region of each of the plurality of event video files;

upload the high-priority region of each of the plurality of event video files; and upload each of the plurality of event video files based at least in part on the event upload priority, file upload priority, and file upload time allocation for each of the plurality of event video files, wherein to upload one of the plurality of event video files, the vehicle controller is further programmed to:

establish a connection with the remote server using the vehicle communication system;

upload a first group of pictures of the one of the plurality of event video files using the connection with the remote server;

measure a connection speed of the connection with the remote server;

determine an expected achievable data upload volume based at least in part on the file upload time allocation and the connection speed;

compare the expected achievable data upload volume to a remaining data volume of the one of the plurality of event video files;

adjust a bitrate of a second group of pictures of the one of the plurality of event video files in response to determining that the expected achievable data upload volume is less than the remaining data volume of the one of the plurality of event video files, wherein the bitrate is adjusted based at least in part on the expected achievable data upload volume and the remaining data volume of the one of the plurality of event video files; and upload the second group of pictures of the one of the plurality of event video files.

19. The system of claim 18, wherein the event upload priority is determined based at least in part an importance and/or a time-sensitivity of each of the plurality of unique events.

20. The system of claim 19, wherein the file upload priority is determined based at least in part on how visible each of the plurality of unique events is in each of the plurality of event video files, wherein one of the plurality of event video files showing a complete view of one of the plurality of unique events is assigned a highest file upload priority.

* * * * *